United States Patent
Mitlin et al.

(10) Patent No.: US 6,732,323 B1
(45) Date of Patent: May 4, 2004

(54) METHOD OF SELECTING INITIALIZATION PARAMETERS FOR MULTI-CHANNEL DATA COMMUNICATION WITH FORWARD ERROR CORRECTION

(75) Inventors: Vlad Mitlin, San Diego, CA (US); Tim Murphy, Ramona, CA (US); Richard G. C. Williams, San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 457 days.

(21) Appl. No.: 09/689,367

(22) Filed: Oct. 12, 2000

(51) Int. Cl.[7] .................. H03M 13/00; G01R 31/28; H04B 1/38
(52) U.S. Cl. .................. 714/784; 714/712; 375/222
(58) Field of Search ................ 714/784, 758, 714/25, 712, 752, 821; 375/222, 219, 260

(56) References Cited

U.S. PATENT DOCUMENTS

| | | | |
|---|---|---|---|
| 5,479,447 A | * 12/1995 | Chow et al. | 375/260 |
| 5,737,337 A | * 4/1998 | Voith et al. | 714/702 |
| 5,852,633 A | 12/1998 | Levin et al. | |
| 5,907,563 A | * 5/1999 | Takeuchi et al. | 714/751 |
| 5,946,346 A | * 8/1999 | Ahmed et al. | 375/219 |
| 6,034,996 A | * 3/2000 | Herzberg | 375/265 |
| 6,064,692 A | 5/2000 | Chow | |
| 6,072,779 A | 6/2000 | Tzannes et al. | |
| 6,075,821 A | 6/2000 | Kao et al. | |
| 6,088,387 A | * 7/2000 | Gelblum et al. | 375/222 |
| 6,236,674 B1 | * 5/2001 | Morelli et al. | 375/219 |
| 6,353,627 B1 | * 3/2002 | Schilling | 375/130 |
| 6,363,109 B1 | * 3/2002 | Polley et al. | 375/222 |
| 6,370,669 B1 | * 4/2002 | Eroz et al. | 714/774 |
| 6,449,288 B1 | * 9/2002 | Chari et al. | 370/470 |
| 6,477,669 B1 | * 11/2002 | Agarwal et al. | 714/708 |
| 6,493,402 B1 | * 12/2002 | Fimoff | 375/321 |
| 6,529,558 B1 | * 3/2003 | Fimoff et al. | 375/262 |

OTHER PUBLICATIONS

Dimitri Bertsekas and Robert Gallager, "Data Networks," 1992, pp. 64–86 and 149–241, Pretice Hall, Upper Saddle River, NJ, USA.

(List continued on next page.)

*Primary Examiner*—Phung M. Chung
*Assistant Examiner*—Matthew C. Dooley
(74) *Attorney, Agent, or Firm*—Ernest J. Befel, Jr.; Haynes Beffel & Wolfeld LLP (57) ABSTRACT

The present invention includes alternative methods for selecting forward error correction parameters to be used in multi channel communications. Method embodying aspects of the present invention may include acquiring signal to noise ratio data for a set of communications channels, counting, estimating or identifying channels to carry data, computing an average signal to noise ratio for channels used and selecting set(s) of FEC parameters. It may predicting net SNR gains and storing these predictions as splines or in interpolation tables. This invention is specifically applicable to Reed-Solomon encoding for FEC and selecting the Reed-Solomon parameters S and R/S. Symbol sets, represented by S may consist of dmt symbols or of data carried by multiple channels in one transmission interval. The computations for selecting parameters may include adjusting the average signal to noise ratio by a safety margin. The selected sets of parameters may be chosen from sets identified by a sending terminal and may be forwarded from a receiving terminal to a sending terminal.

31 Claims, 4 Drawing Sheets

OTHER PUBLICATIONS

John A. C. Bingham, "Multicarrier Modulation for Data Transmission: An Idea Whose Time Has Come," IEEE Communications Magazine, May 1990, pp. 5–14.

Walter Y. Chen, "DSL: Simultation Techniques and Standards Development for Digital Subscriber Line Systems," 1998, pp. 465, 11, and 119–121, MacMillan Technical Publishing, Indianapolis, IN, USA.

Peter Sienpin Chow, "Bandwidth Optimized Digital Transmission Techniques for Spectrally Shaped Channels with Implulse Noise," Ph.D. Thesis, Stanford University, May 1993, pp. ii–187.

Peter S. Chow, John M. Cioffi, and John A. C. Bingham, "A Practical Discrete Multitone Transceiver Loading Algorithm for Data Transmission over Spectrally Shaped Channels," IEEE Transactions on Communications, Feb./Mar./Apr. 1995, pp. 773–775, vol. 43, No. 2/3/4.

N. G. de Bruijn, "Asymptotic Methods in Analysis," 1981, pp. 22–23, Dover Publications, Inc., New York, NY, USA.

F.J. MacWilliams and N. J. A. Sloane, "Reed–Solomon and Justesen codes," The Theory of Error–Correction Codes, 1977, p. 306, Elsevier Science.

Vladimir S. Mitlin, "Nonlinear Dynamics of Reservoir Mixtures," 1993, pp. 173–177, CRC Press.

William H. Press, Saul A. Teukolsky, William T. Vetterling, and Brian P. Flannery, "Numerical Recipes in C—The Art of Scientific Computing, Second Edition," 1992, pp. 212–221, Cambridge University Press.

John G. Proakis, "Digital Communications," 1995, pp. 260–263, 278–282, 441, and 464–67, McGraw–Hill, Inc., New York, NY, USA.

ITU–T Recommendation G.992.1: Asymmetric Digital Subscriber Line (ADSL) Transceivers, 1999, pp. i–240, Geneva.

ITI–T Recommendation G.992.2: Splitterless Asymmetric Digital Subscriber Line (ADSL) Transceivers, 1999, pp. i–165, Geneva.

* cited by examiner

FIG. 4B

METHOD OF SELECTING INITIALIZATION PARAMETERS FOR MULTI-CHANNEL DATA COMMUNICATION WITH FORWARD ERROR CORRECTION

RELATED APPLICATION REFERENCE

The present application is related to co-pending U.S. Provisional Application No. 60/239,811, entitled Performance Evaluation of Multicarrier Channels with Error Correction and Retransmission, invented by Vlad Mitlin, Tim Murphy, Richard G. C. Williams and A. Joseph Mueller, filed on the same day as the present application, and owned by the same assignee now and at the time of the invention. That co-pending application is incorporated by reference herein.

BACKGROUND OF THE INVENTION

1. Field of the Invention

The present invention relates to multi-channel data communications, including xDSL communications. More particularly, it relates to selecting or modifing forward error correction parameters used during a communications session.

2. Description of Related Art

The emerging availability of xDSL service across existing twisted pair copper wires has been a boon for small business and residential customers. This boon has been facilitated by promulgation of xDSL standards by the International Telecommunication Union (ITU), Telecommunication Standardization Sector of the ITU (ITU-T). The family of DSL Recommendations includes the following: G.992.1, G.992.2, G.991.1, G.996.1, G.994.1, G.997.1 and G.995.1. Recommendation G.995.1 provides an overview of these standards. Recommendations G.991.1, G.992.1, G.992.2 have developed techniques for transmitting a range of bit rates over the existing copper local network from relatively short distances at high bit rates, and to long distances at relatively lower bit rates. Recommendations G.994.1, G.996.1 and G.997.1 support G.992.1 and G.992.2 by providing common handshake, management and testing procedures. These standards allow substantial flexibility in implementation. For instance, an ADSL Transceiver Unit (ATU) may be configured to support synchronous (STM) or asynchronous (ATM) data.

An important aspect of setting up an xDSL communication session is selection of Reed Solomon encoding parameters for forward error correction (FEC). Following handshakes, initialization begins. This includes channel analysis and FEC parameter exchange. While the ITU standards proscribe protocols for initialization, they do not describe how ATU equipment at the central office (ATU-C) or the remote user location (ATU-R) should act on data produced by channel analysis or how these ATUs should select FEC parameters to exchange. They set a bit error rate standard (BER) of $\epsilon=10^{-7}$, but give no guidance on selection of FEC parameters to most effectively achieve that BER. This is a weakness of the standards.

Selection of FEC parameters is important because these parameters control both forward error correction and data transmission. Reed-Solomon forward error correction encoding is computationally complex, especially when high levels of error correction flexibility are adopted. It involves the overhead of redundant data, which reduces effective throughput.

Therefore, it is desirable to develop a method for consistently selecting favorable FEC parameters, based on available channel analysis data, both for initialization and revision of FEC parameters. Parameters should be selected to satisfy a BER criteria, whether the ITU criteria or a more stringent criteria.

SUMMARY OF INVENTION

The present invention includes a method for selection of forward error correction parameters used in data communications, including computing an average signal to noise ratio of a set of communications subchannels, determining a number of effective communications subchannels loaded with data bits, and selecting one or more sets of forward error correction parameters based on the average signal to noise ratio and the number of effective communications subchannels. One aspect of the present invention is that it applies to xDSL communications using a discrete multi-tonal carrier to provide subchannels. This DMT carrier may have 96 or fewer subchannels, which may be discrete or overlapping frequency bands. The DMT carrier may be generated by application of an inverse discrete Fourier transform. The forward error correction encoding for which parameters are selected may be Reed-Solomon encoding. The parameters may be a number (S) of dmt frames in an FEC frame, and a number (R/S) of redundant FEC symbols per dmt frame. The method may further include computing predetermined net coding gains, for dimensions of the average signal to noise ratio, the number of effective communications subchannels, and for the FEC parameters S, R/S. The predetermined net coding gains may be expressed in lookup tables, bicubic splines, piecewise linear approximations or any other convenient storage format. This method may further include computing predetermined sets of preferred FEC parameters S, R/S, based on the predetermined net coding gains for pairs of average signal to noise ratio and number of effective communications subchannels. Alternatively, net coding gains may be calculated and sets of preferred FEC parameters selected after initialization begins.

The present invention may be practiced as a method for selecting forward error correction parameters to be used in multi channel communications. A method embodying aspects of the present invention may include acquiring signal to noise ratio data for a set of communications channels, identifying a subset of those channels to carry data or otherwise counting or estimating the number of such channels, computing an average signal to noise ratio for the subset of channels and selecting set(s) of FEC parameters, using the average SNR and number of data carrying channels. Aspects of this embodiment include use of Reed-Solomon encoding for FEC and selecting the parameters S and R/S. Symbol sets, represented by S may consist of dmt symbols or of data carried by multiple channels in one transmission interval. The universe of parameters S and R/S may be set by international standard and may have certain values set forth below. The computations for selecting parameters may include adjusting the average signal to noise ration by a safety margin. The selected sets of parameters may be chosen from sets identified by a sending terminal and may be forwarded from a receiving terminal to a sending terminal.

Aspects of the present invention also may be embodied in a method of selecting FEC parameters including the steps of acquiring signal to noise ratio data, estimating, identifying or counting channels to be used, computing an average SNR and selecting set(s) of FEC parameters based on SNR data and the number of channels to be used, wherein a downstream terminal selects the parameters for downstream transmission and an upstream terminal selects the parameters for upstream transmission. As in the prior method, aspects of this embodiment include use of Reed-Solomon encoding, subject to parameters S and R/S, where symbol sets may be dmt symbols or other sets of data transmitted in intervals. Acceptable FEC parameters may be set by international standard and may be constrained in one direction or the other by the sending terminal.

Another embodiment practicing aspects of the present invention may be a method of selecting FEC parameters for multi channel communications including the steps of predicting net SNR gains for pairs of FEC parameters S and R/S across ranges of SNR and number of communications channels used, storing preferred pairs of FEC parameters for at least a portion of those ranges, corresponding to predicted net SNR gains, and selecting set(s) of preferred FEC parameters. Aspects of this embedment include storing the set(s) of parameters in a table organized by SNR and number of communications channels used, wherein the SNR range includes 10–50 dB and the number of channels used includes 1–96 channels (as for G.lite downstream), 1–224 channels (as for G.dmt downsteam) or 1–26 channels (as for G.lite or G.dmt upstream.)

A further embodiment practicing aspects of the present invention may include the steps of storing functions predicting a net SNR gain for pairs of FEC parameters S and R/S across ranges of SNR and number of communications channels used, measuring an average SNR ratio for multiple channels and estimating, identifying or counting a number of channels to be used, predicting the net SNR gain for pairs of FEC parameters using the SNR and number of communication channels data, and selecting pair(s) of FEC parameters. Aspects of this embodiment may include storing the functions as bicubic splines or as a series of interpolation tables.

DETAILED DESCRIPTION

The foregoing description of various embodiments of the invention has been presented for purposes of illustration and description. The description is not intended to limit the invention to the precise forms disclosed. Many modification and equivalent arrangements will be apparent to people skilled in the art.

Figure 1:
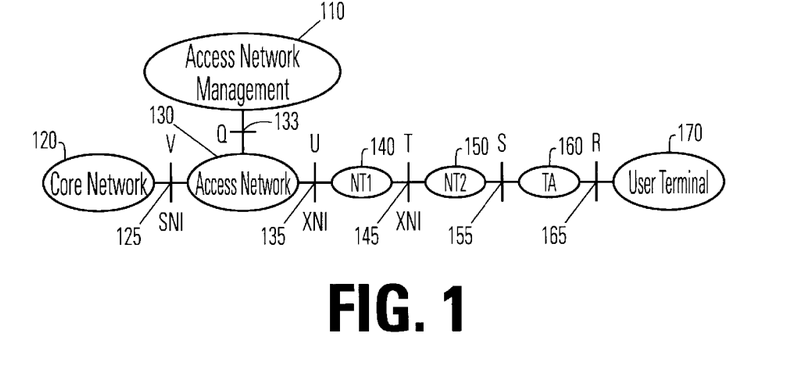
FIG. 1 is the ITU's generic reference model for a communications network.
Figure 2:
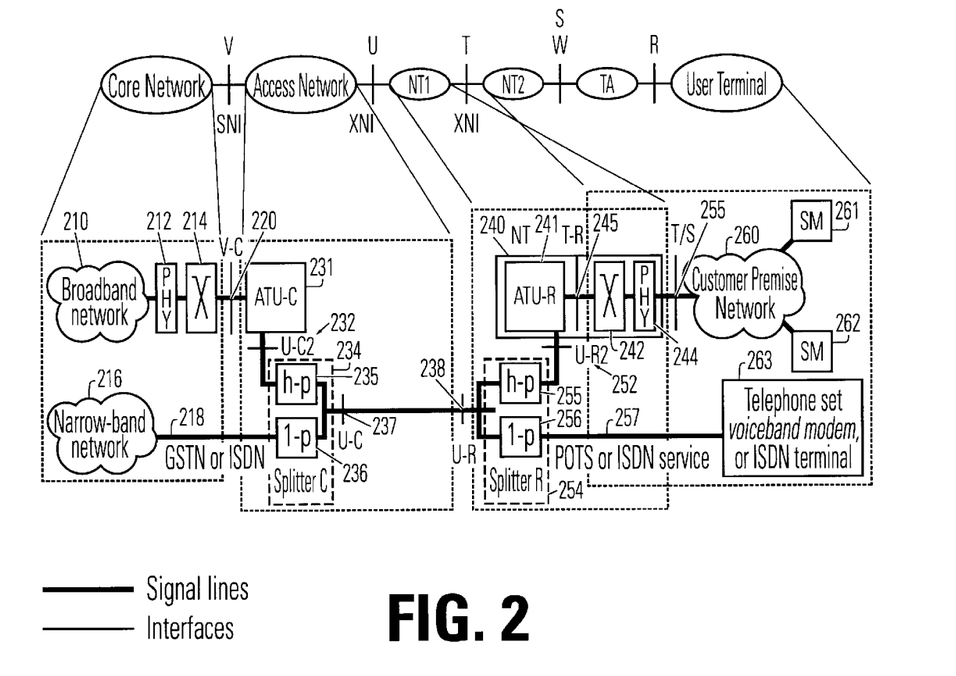
FIG. 2 is the ITU's mapping of the generic reference model to the G.992.1 standard.

An embodiment of the present invention is described with reference to the ITU's recommendations and reference configurations. A communication network reference configuration is depicted in FIGS. 1–2. FIG. 1 is the ITU's generic reference configuration of a generic xDSL network, based on the reference configuration previously used for ISDN data communications, as depicted in Recommendation G.995.1, FIG. 1. FIG. 2 is the ITU's system reference model for Recommendation G.992.1, depicted in alignment with the generic model. These figures illustrate one environment in which the present invention may be applied.

FIG. 1 identifies reference points in a generic xDSL network. There are seven elements in this generic reference configuration: a core network 120, an access network 130, a first network to termination (NT1) 140, a second network termination (NT2) 150, a terminal adapter (TA) 160 and an access network management feature 110. These elements support a user terminal 170. The core and access networks converge at the V interface 125. Access network management is provided to the access network across the Q interface 133. The NT1 connects to the access network at the U reference point 135, to provide service presentation to a customer on a logical or physical interface at the T reference point 145. An NT2 connects the network at the T reference point 145 and may support multiple user terminal adapters (TA) on the interface at the S reference point 155. The NT2 terminates the transport protocol, such as an ATM transport protocol, for user traffic, and may implement switching or routing functions. The NT2 may be integrated with an NT1 to form an NT1/2. A terminal adapter adapts the transport protocol to specific requirements of a user terminal. One or more of the elements in the reference configuration may be null and some scenarios, according to the ITU standards. One or more reference points or functions may be merged.

Additional detail describing an environment in which the present invention may be applied appears in FIG. 2. This environment uses splitters to separate traditional voice and ISDN data traffic from broadband traffic. A similar diagram is provided by the ITU for a splitterless configuration, in which high pass and low pass filter functions are distributed among various pieces of equipment.

In FIG. 2, the elements from FIG. 1 appear at the top of the figure and components are mapped to these elements. As depicted, the core network may include functions such a concentrator, a switch and interfaces to broadband and narrowband networks. The components illustrated in FIG. 2 include a broadband network 210, a physical layer 212, a switch or concentrator 214, a narrowband network 216 and signal lines for general switched telephone network service (GSTN) or ISDN service 218. The V-C interface 220 between the core network and central office access network is defined only in terms of logical functions. The V-C interface 220 may consist of interfaces to one or more switching systems, such as STM or ATM switching systems, according to the standards.

An ADSL access network may include an ADSL transceiver unit for the central office (ATU-C) 231, a POTS splitter 234 to separate the POTS and ADSL channels, the copper loop plant. The POTS splitter 234 may comprise a high pass filter 235 and a low pass filter 236. One or both of these filters may be integrated into the ATU-C unit 231. Then, the U-C interface 237 supplants the U-C2 interface 232. Due to the asymmetry of signals in an ADSL multichannel implementation, the ITU standards distinctly specify the transmitted signals at the U-C 237 and U-R 238 reference points.

In an ADSL communications system, the ADSL-NT1 may include: an ADSL transceiver unit identified as being at the remote terminal end (ATU-R), a multiplexer and demultiplexer, higher layer functions, and an interface to the user terminal or to a home network. Many of the same functions are present at remote terminal and central office. The remote terminal may have an NT1 unit 240 and a POTS splitter 254. The NT1 may include an ATU-R 241, a switch or concentrator 242, and a physical layer 244. The splitter 254 may include both high and low pass filters 255, 256. An ADSL NT2, terminal adapter and user terminal may share some or all of the NT1 functionalities. Accordingly, the mapping of NT2 functions in FIG. 2 overlaps with the mapping of the NT1 functions. In communication with the NT2 functions, a signal line 257 connects to user equipment such as a telephone set, voiceband modem or ISDN terminal 263. A physical layer interface 255 connects the NT1 241 to the customer premise network 260 to which multiple devices 261, 262 may be connected.

Reed-Solomon encoding is a forward error correction (FEC) method utilized in ADSL communications and other applications to detect and correct transmission errors, effectively increasing the signal-to-noise ratio of the communications channel. By using proper encoding of information, errors induced by a noisy communications channel can be reduced without reducing the rate of transmission. Redundancy data or symbols are added to the information or symbols transmitted to enable the receiver to extract the original information, despite noise introduced by the channel. When more redundancy symbols are added, a greater level of noise typically can be tolerated. The cost of adding more redundancy symbols is a reduced net transmission rate and added burdens of encoding and decoding. The theory and practice of Reed-Solomon encoding are described in many references, including Shu Lin & Daniel J. Costello, Jr., "Error Control Coding: Fundamentals and Applications", Prentice Hall (Englewood Cliffs, N.J. 1983) and Stephen B. Wicker & Vijay K. Bhargava, eds., "Reed-Solomon Codes and Their Applications", IEEE Press (Piscataway, N.J. 1994).

In communications generally, the signal-to-noise ratio provides a metric for Gaussian or randomly distributed noise and resulting errors. In ADSL communications, the current ITU standards set a bit error rate (BER) criteria of $\epsilon=10^{-7}$. By measuring the signal-to-noise ratios of channels used in communications, transmission parameters can be selected which predictably will yield the desired BER. Among the transmission parameters to be selected in ADSL communications are FEC parameters for Reed-Solomon encoding. These parameters determine the amount of data in a single codeword, to which redundancy symbols are added, and the number of redundancy symbols added.

A discrete multitone (DMT) signal is used to carry data downstream and upstream in ADSL communications. Because ADSL is asymmetrical, different numbers of channels are used to provide different transmission rates in downstream and upstream directions. By convention, the downstream direction is from the central office to the remote terminal and the upstream direction is the opposite. The remote terminal may be referred to as the downstream terminal and the central office terminal as the upstream terminal. Typically, higher communications rates are supported for transmitting data downstream than upstream.

A DMT signal is broken into multiple channels which are assigned discrete frequency bands (potentially overlapping) as described more fully in references such as "Method and Apparatus for Adaptive, Variable Bandwidth, High-Speed Data Transmission of a Multicarrier Signal Over Digital Subscriber Lines," U.S. Pat. No. 5,479,447 (issued Dec. 26, 1995). The ITU standards allocate these channels to a variety of overhead, downstream data and upstream data purposes. Because individual channels operate at different frequencies, they have different operating characteristics. For instance, more power is required and greater attenuation is experienced in higher frequency bands.

A DMT symbol is defined in the ITU standards as including the number of bits that are loaded on all of the channels (in one direction) during one transmission interval. One second of DMT signal may be divided into an average of 4000 data carrying DMT symbol transmission intervals. Typically, 68 data carrying DMT symbols are followed by a synchronization symbol. The selected transmission interval does not correspond to a particular number of cycles in any particular channel, because the multiple channels operate in different frequency bands. Different numbers of bits are loaded on different channels, carriers or subcarriers to match their capacity, which depends on frequency, power, signal-to-noise ratio and other signal and physical layer characteristics.

The capacity of a DMT signal to carry information bits is analyzed when a communications session is established between a particular central office and remote terminal user. It is analyzed in both the downstream and upstream directions. The signal to noise ratio of each discrete subcarrier or channel of the DMT multi-channel signal is measured and can be expressed as a signal-to-noise ratio (SNR). Leading texts, such as J. Proakis, "Digital Communications," pp. 464–67, McGraw-Hill (New York, 1995), imply that the information carrying capacity of a DMT signal should be analyzed on a channel-by-channel basis. Algorithms for loading bits on a channel-by-channel basis, including so called "bit pouring" algorithms, are described in U.S. Pat. No. 4,479,447, supra, and also in "Method for Allocating Data in a Data Communication System," U.S. Pat. No. 5,852,633 (issued Dec. 22, 1998) and "Adaptive Allocation for Variable Bandwidth Multicarrier Communication," U.S. Pat. No. 6,072,779 (issued Jun. 6, 2000). Channel-by-channel analysis is an analytically complex and demanding approach for selection of FEC parameters. The present invention involves an average-based approximation which greatly simplifies analysis.

1. Net and Line Coding Gain

The present invention includes a procedure for selecting FEC parameters which improve the potential net coding gain resulting from application of FEC. Alternative FEC parameters are analyzed and preferred alternatives are selected for use in negotiations between transmitting and receiving terminals or ATUs, for both downstream and upstream multi-channel communications. There are two measures of coding gain from use of FEC, line coding gain and net coding gain, which can be expressed in bits or dB. Line coding gain is the increased amount of data that can be carried across multiple communications channels due to FEC, while satisfying a BER criteria. This data includes overhead for FEC redundancy symbols. Net coding gain is a net measure, subtracting the redundancy symbols required for FEC from the total data transmitted to determine the net gain in information transmitted. In this sense, information should be distinguished from data, as information is what the sending and receiving terminals or ATUs are communicating, carried by data which includes FEC and other overhead.

The net coding gain (NCG) $g_{n,dB}$ is a measure in dB of net signal-to-noise ratio gain due to FEC. It is a function of the permissible bit loading at a particular effective signal-to-noise ratio $\gamma_{eff}$ for coded data $b_0(\gamma_{eff})$ and uncoded data $b_0(\gamma_{eff})$ The net coding gain is defined in equation (1.1) as:

$$g_{n,dB} \equiv 3.01 \cdot \left[ \frac{K}{K+S+R} b(\gamma_{eff}) - \frac{K}{K+S} b_0(\gamma_{eff}) \right] \quad (1.1)$$

In this equation, K is the length of the information portion of a Reed-Solomon codeword, S is the number of symbol sets per codeword, and R is the number of redundancy symbols per codeword. $\gamma_{eff}$ is the effective signal-to-noise ratio, an average signal-to-noise ratio across channels on which data is to be loaded; it ignores those channels which do not carry data:

$$\gamma_{\text{eff}} = \frac{1}{n_{\text{eff}}} \sum_{\gamma_i > \gamma^*} \gamma_i \quad (1.2)$$

In equations 1.2 and 1.3, $\gamma^*$ is the SNR threshold level below which the system will not use or load data onto a channel or subcarrier. The effective number of sub-carriers can be represented as:

$$n_{\text{eff}} = \sum_{\gamma_i > \gamma^*} 1 \quad (1.3)$$

A symbol set is a set of bits transmitted in one transmission interval, typically delimited by an overhead symbol. The more transmission intervals required to transmit symbol sets combined into a single codeword, the more synchronization overhead incurred. The function $b(\gamma_{\text{eff}})$ is the average number of bits per channel carried as encoded data at the effective signal-to-noise ratio $\gamma_{\text{eff}}$, consistent with the error rate criteria $\epsilon$; $b_0(\gamma_{\text{eff}})$ is the average number of bits per channel carried as uncoded data at the same effective signal-to-noise ratio and error rate. The constant 3.01 (i.e., 10 log 2) expresses conversion of bit gain into dB gain. Equation (1.1) takes into account that some of the bits transmitted in an encoded data stream are overhead bits and others are used for redundancy symbols.

The line coding gain (LCG) per sub-carrier is defined as follows:

$$g_{l,dB} = 3.01 \cdot [b(\gamma_{\text{eff}}) - b_0(\gamma_{\text{eff}})] \quad (1.4)$$

Line coding gain characterizes all the excess data per sub-carrier transmitted due to FEC, including redundancy and overhead data.

Note that $\gamma_{\text{eff}}$ an average signal-to-noise ratio. This is not covered in discussions of the channel-by-channel approach in J. Proakis, "Digital Communications," pp. 464–67, and others. In practice, when G.lite/G.dmt compliant DSL modems calculate an adjusted signal-to-noise ratio based on gain resulting from FEC coding, they typically add a proxy for line coding gain to the SNR value for each channel. This proxy typically has been a constant, such as 3 dB, in lieu of calculating an actual gain resulting from FEC coding.

For G.lite/G.dmt compliant systems, the DMT symbol size relates to the FEC codeword or frame size as follows:

$$b(\gamma_{\text{eff}}) = \frac{B_{DMT}}{n_{\text{eff}}} = \frac{\alpha}{Sn_{\text{eff}}}(K + S + R) \quad (1.5)$$

where $\alpha = 8$ is the size of a code symbol for the commonly used Reed-Solomon code. Basically, the FEC frame size includes an integer multiple of DMT symbols, each having size $B_{DMT}$ bit, which include information, overhead and redundancy.

Next, we derive expressions to relate LGC, the FEC frame size and the DMT symbol size to NGC, $b_0(\gamma_{\text{eff}})$, and $n_{\text{eff}}$. Introducing Eq.(1.5) into Eq.(1.1) yields $$0.3322 \cdot g_{n,dB} = \frac{\alpha K}{Sn_{\text{eff}}} - \frac{K}{K+S} b_0(\gamma_{\text{eff}}) \quad (1.6)$$

Eq.(1.6) can be rewritten in the form of a quadratic equation for K:

$$\alpha K^2 + K[\alpha S - b_0(\gamma_{\text{eff}})Sn_{\text{eff}} - 0.3322 \cdot Sn_{\text{eff}} g_{n,dB}] - 0.3322 \cdot S^2 n_{\text{eff}} g_{n,dB} = 0 \quad (1.7)$$

An appropriate (positive) root of Eq.(1.7) is:

$$K = \frac{S}{2\alpha} \quad (1.8)$$

$$\left\{ \begin{array}{l} [(\alpha - b_0(\gamma_{\text{eff}})n_{\text{eff}} - 0.3322 \cdot n_{\text{eff}} g_{n,dB})^2 + 1.3288 \cdot \alpha n_{\text{eff}} g_{n,dB}]^{1/2} - \\ (\alpha - b_0(\gamma_{\text{eff}})n_{\text{eff}} - 0.3322 \cdot n_{\text{eff}} g_{n,dB}) \end{array} \right\}$$

Introducing Eq.(1.8) into Eq.(1.5) yields:

$$b(\gamma_{\text{eff}}) = \frac{1}{n_{\text{eff}}} \left\{ \begin{array}{l} \frac{\alpha(S+R)}{S} \\ +0.5[(\alpha - b_0(\gamma_{\text{eff}})n_{\text{eff}} - 0.3322 \cdot n_{\text{eff}} g_{n,dB})^2 \\ \quad 1.3288 \cdot \alpha n_{\text{eff}} g_{n,dB}]^{1/2} \\ -0.5(\alpha - b_0(\gamma_{\text{eff}})n_{\text{eff}} - 0.3322 \cdot n_{\text{eff}} g_{n,dB}) \end{array} \right\} \quad (1.9)$$

Finally, combining Eqs. (1.9) and yields $$g_{d,dB} = \frac{3.01}{n_{\text{eff}}} \left\{ \begin{array}{l} \frac{\alpha(S+R)}{S} \\ +0.5[(\alpha - b_0(\gamma_{\text{eff}})n_{\text{eff}} - 0.3322 \cdot n_{\text{eff}} g_{n,dB})^2 \\ \quad 1.3288 \cdot \alpha n_{\text{eff}} g_{n,dB}]^{1/2} \\ -0.5(\alpha + b_0(\gamma_{\text{eff}})n_{\text{eff}} - 0.3322 \cdot n_{\text{eff}} g_{n,dB}) \end{array} \right\} \quad (1.10)$$

Using Eqs. (1.2) and (1.5), Eq.(1.10) is complemented by the following two equations:

$$B_{DMT} = n_{\text{eff}} b(\gamma_{\text{eff}}) = n_{\text{eff}}[b_0(\gamma_{\text{eff}}) + 0.3322 \cdot g_{l,dB}] \quad (1.11)$$

$$K = \frac{Sn_{\text{eff}}[b_0(\gamma_{\text{eff}}) + 0.3322 \cdot g_{l,dB}]}{\alpha} - S - R \quad (1.12)$$

Thus, we have derived expressions which relate LGC, the size of the information portion of the FEC frame size and the DMT symbol size to NGC, $b_0(\gamma_{\text{eff}})$ and $n_{\text{eff}}$.

2. Uncoded Bit Load

For further formulation of the method, an expression for $b_0(\gamma_{\text{eff}})$ is needed. For a 3-coefficient scrambler polynomial and an 8-bit size code symbol, the uncoded bit load of a subcarrier at the BER of $\epsilon$ is related to the subcarrier's SNR as follows:

$$b_0 = \frac{\gamma + \Phi(\gamma, \varepsilon)}{3.01} \quad (2.1)$$

$$\Phi(\gamma, \varepsilon) = \quad (2.2)$$

$$10 \log \left\{ 10^{-\gamma/10} + \frac{1.3029}{2\log(1/\varepsilon) - 0.7096 - \log[\log(1/\varepsilon) - 0.0232]} \right\}$$

In G.lite/G.dmt $\epsilon = 10^{-7}$, and Eqs. (2.1) and (2.2) can be rewritten as:

$$b_0 = \frac{\gamma + 10\log(10^{-\gamma/10} + 0.1047)}{3.01} \quad (2.3)$$

Except for the case of very low SNR ($\gamma \leq 10$ dB), the exponential term in Eq.(2.3) can be omitted which yields a linear relationship between $\gamma$ and b:

$$\gamma = 3.01 \cdot b_0 + 9.8 \quad (2.4)$$

As Eq.(2.4) is linear, it properly describes the relationship between an average SNR, $\gamma_{eff}$, and the average uncoded bit load at $\epsilon = 10^{-7}$, $b_0(\gamma_{eff})$. Therefore, Eqs. (1.10) to (1.12), (2.3), and (2.4) relate LCG, the FEC frame size, and the DMT symbol size to only two parameters, $\gamma_{eff}$ and $n_{eff}$, for given R and S.

It follows from Eqs. (2.4) and (1.11) that:

$$\gamma_{eff} = 9.8 + \frac{3.01 \cdot B_{DMT} - n_{eff} \cdot g_{l,dB}}{n_{eff}} \quad (2.5)$$

Eq.(2.5) can be used by CO in preparation for C-RATES-RA.

Eqs. (2.4) and (2.5) can be further refined in the low SNR range. A more precise form is obtained by rewriting Eq.(2.3) as follows:

$$\gamma = 3.01 \cdot b_0 - 10 \log(10^{-\gamma/10} + 0.1047) \quad (2.6)$$

and applying the method of successive approximations to solving Eq.(2.6) for $\gamma$. The first approximation of this solution is given by Eq.(2.4). The second approximation is found by introducing the first approximation into the right hand side of Eq.(2.6). This yields:

$$\gamma = 3.01 \cdot b_0 - 10 \log(10^{-0.301 \cdot b_0 - 0.98} + 0.1047) \quad (2.7)$$

Eq.(2.7) works better than Eq.(2.4) in the low SNR range: for instance, the relative error in using Eq.(2.7) at $\gamma = 10$ dB is about 10 percent, as compared to about 28 percent when Eq.(2.4) is applied at the same SNR. At $\gamma = 20$ dB it does not really matter whether Eq.(2.4) or (2.7) is used.

Combining Eq.(2.7) and (1.11), Eq.(2.5) is modified as follows:

$$\gamma_{eff} = 3.01 \cdot B_{DMT}/n_{eff} - g_{l,dB} - 10 \log(10^{-0.301 \cdot B_{DMT}/n_{eff} + 0.1 \cdot g_{l,dB} - 0.98} + 0.1047) \quad (2.8)$$

Eq.(2.8) should be used instead of Eq.(2.5) when one deals with poor ($\gamma_{eff} \sim 10$ dB) quality of an ADSL channel.

3. Mathematical Method and Tables

Because the relevant equations can readily be solved by numerical methods, it is preferred to solve them first and then implement them in a sending or receiving terminal at the CO or RT locations. The following tables are derived from Eqs. (3.1)–(3.3), below. These tables apply to G.lite; tables anticipating more channels would be appropriate for G.dmt compliant modems. Other tables would be constructed for other variations of xDSL or other multichannel communications protocols. The rows of the tables indicate the number of channels or subcarriers to be loaded with data. The columns are the average SNR across channels. Cells of these tables list positive net coding gains in dB; negative and zero gain values are all set to 0.0 dB.

TABLE 1

(S = 1, R/S = 4)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.0 | 0.0 | 0.0 | 0.0 |
| 26 | 0.0 | 0.0 | 0.0 | 0.0 | 0.0 |
| 31 | 0.0 | 0.2 | 0.2 | 0.2 | 0.2 |
| 36 | 0.0 | 0.5 | 0.6 | 0.6 | 0.5 |
| 41 | 0.0 | 0.8 | 0.9 | 0.8 | 0.8 |
| 46 | 0.1 | 1.0 | 1.1 | 1.0 | 1.0 |
| 51 | 0.3 | 1.2 | 1.2 | 1.2 | 1.2 |
| 56 | 0.4 | 1.3 | 1.4 | 1.3 | 1.3 |
| 61 | 0.5 | 1.4 | 1.5 | 1.4 | 1.4 |
| 66 | 0.6 | 1.5 | 1.6 | 1.5 | 1.5 |
| 71 | 0.7 | 1.6 | 1.6 | 1.6 | 1.6 |
| 76 | 0.8 | 1.6 | 1.7 | 1.7 | 1.6 |
| 81 | 0.8 | 1.7 | 1.8 | 1.7 | 1.7 |
| 86 | 0.9 | 1.7 | 1.8 | 1.8 | 1.7 |
| 91 | 0.9 | 1.8 | 1.8 | 1.8 | 1.8 |
| 96 | 1.0 | 1.8 | 1.9 | 1.8 | 1.8 |

TABLE 2

(S = 1, R/S = 8)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.0 | 0.0 | 0.0 | 0.0 |
| 26 | 0.0 | 0.0 | 0.0 | 0.0 | 0.0 |
| 31 | 0.0 | 0.0 | 0.0 | 0.0 | 0.0 |
| 36 | 0.0 | 0.0 | 0.0 | 0.0 | 0.0 |
| 41 | 0.0 | 0.0 | 0.0 | 0.0 | 0.0 |
| 46 | 0.0 | 0.3 | 0.3 | 0.2 | 0.2 |
| 51 | 0.0 | 0.6 | 0.6 | 0.6 | 0.5 |
| 56 | 0.0 | 0.9 | 0.9 | 0.8 | 0.8 |
| 61 | 0.1 | 1.1 | 1.1 | 1.1 | 1.0 |
| 66 | 0.2 | 1.3 | 1.3 | 1.3 | 1.2 |
| 71 | 0.4 | 1.4 | 1.5 | 1.4 | 1.4 |
| 76 | 0.5 | 1.6 | 1.6 | 1.6 | 1.5 |
| 81 | 0.6 | 1.7 | 1.7 | 1.7 | 1.6 |
| 86 | 0.8 | 1.8 | 1.8 | 1.8 | 1.7 |
| 91 | 0.8 | 1.9 | 1.9 | 1.9 | 1.8 |
| 96 | 0.9 | 2.0 | 2.0 | 1.9 | 1.9 |

TABLE 3

(S = 1, R/S = 16)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.0 | 0.0 | 0.0 | 0.0 |
| 26 | 0.0 | 0.0 | 0.0 | 0.0 | 0.0 |
| 31 | 0.0 | 0.0 | 0.0 | 0.0 | 0.0 |
| 36 | 0.0 | 0.0 | 0.0 | 0.0 | 0.0 |
| 41 | 0.0 | 0.0 | 0.0 | 0.0 | 0.0 |
| 46 | 0.0 | 0.0 | 0.0 | 0.0 | 0.0 |

TABLE 3-continued (S = 1, R/S = 16)

| $n_{eff}$ | $\gamma_{eff}$ | | | | |
|---|---|---|---|---|---|
| | 10 | 20 | 30 | 40 | 50 |
| 51 | 0.0 | 0.0 | 0.0 | 0.0 | 0.0 |
| 56 | 0.0 | 0.0 | 0.0 | 0.0 | 0.0 |
| 61 | 0.0 | 0.0 | 0.0 | 0.0 | 0.0 |
| 66 | 0.0 | 0.0 | 0.0 | 0.0 | 0.0 |
| 71 | 0.0 | 0.1 | 0.1 | 0.0 | 0.0 |
| 76 | 0.0 | 0.4 | 0.4 | 0.3 | 0.2 |
| 81 | 0.0 | 0.6 | 0.6 | 0.5 | 0.5 |
| 86 | 0.0 | 0.8 | 0.9 | 0.8 | 0.7 |
| 91 | 0.0 | 1.0 | 1.1 | 1.0 | 0.9 |
| 96 | 0.1 | 1.2 | 1.2 | 1.1 | 1.0 |

TABLE 4

(S = 2, R/S = 2)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.2 | 0.3 | 0.3 | 0.2 |
| 21 | 0.0 | 0.8 | 0.9 | 0.9 | 0.8 |
| 26 | 0.3 | 1.1 | 1.2 | 1.2 | 1.2 |
| 31 | 0.5 | 1.4 | 1.5 | 1.4 | 1.4 |
| 36 | 0.6 | 1.5 | 1.6 | 1.6 | 1.6 |
| 41 | 0.8 | 1.7 | 1.7 | 1.7 | 1.7 |
| 46 | 0.9 | 1.7 | 1.8 | 1.8 | 1.8 |
| 51 | 0.9 | 1.8 | 1.9 | 1.9 | 1.8 |
| 56 | 1.0 | 1.9 | 2.0 | 1.9 | 1.9 |
| 61 | 1.1 | 1.9 | 2.0 | 2.0 | 1.9 |
| 66 | 1.1 | 2.0 | 2.0 | 2.0 | 1.9 |
| 71 | 1.1 | 2.0 | 2.1 | 2.0 | 2.0 |
| 76 | 1.2 | 2.0 | 2.1 | 2.0 | 0.0 |
| 81 | 1.2 | 2.0 | 2.1 | 2.0 | 0.0 |
| 86 | 1.2 | 2.0 | 2.1 | 2.1 | 0.0 |
| 91 | 1.3 | 2.1 | 2.1 | 2.1 | 0.0 |
| 96 | 1.3 | 2.1 | 2.1 | 0.0 | 0.0 |

TABLE 5

(S = 2, R/S = 4)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.0 | 0.0 | 0.0 | 0.0 |
| 26 | 0.0 | 0.6 | 0.7 | 0.6 | 0.6 |
| 31 | 0.1 | 1.1 | 1.2 | 1.1 | 1.0 |
| 36 | 0.4 | 1.4 | 1.5 | 1.4 | 1.4 |
| 41 | 0.6 | 1.7 | 1.7 | 1.7 | 1.6 |
| 46 | 0.8 | 1.9 | 1.9 | 1.9 | 1.8 |
| 51 | 1.0 | 2.0 | 2.1 | 2.0 | 2.0 |
| 56 | 1.1 | 2.1 | 2.2 | 2.1 | 2.1 |
| 61 | 1.2 | 2.2 | 2.3 | 2.2 | 2.2 |
| 66 | 1.3 | 2.3 | 2.4 | 2.3 | 2.3 |
| 71 | 1.3 | 2.4 | 2.4 | 2.4 | 0.0 |
| 76 | 1.4 | 2.4 | 2.5 | 2.4 | 0.0 |
| 81 | 1.5 | 2.5 | 2.5 | 2.5 | 0.0 |
| 86 | 1.5 | 2.5 | 2.6 | 2.5 | 0.0 |

TABLE 5-continued (S = 2, R/S = 4)

| $n_{eff}$ | $\gamma_{eff}$ | | | | |
|---|---|---|---|---|---|
| | 10 | 20 | 30 | 40 | 50 |
| 91 | 1.5 | 2.5 | 2.6 | 2.5 | 0.0 |
| 96 | 1.6 | 2.6 | 2.6 | 0.0 | 0.0 |

TABLE 6

(S = 2, R/S = 8)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.0 | 0.0 | 0.0 | 0.0 |
| 26 | 0.0 | 0.0 | 0.0 | 0.0 | 0.0 |
| 31 | 0.0 | 0.0 | 0.0 | 0.0 | 0.0 |
| 36 | 0.0 | 0.1 | 0.2 | 0.0 | 0.0 |
| 41 | 0.0 | 0.6 | 0.7 | 0.6 | 0.5 |
| 46 | 0.0 | 1.0 | 1.1 | 1.0 | 0.9 |
| 51 | 0.2 | 1.4 | 1.4 | 1.3 | 1.2 |
| 56 | 0.5 | 1.6 | 1.7 | 1.6 | 1.5 |
| 61 | 0.7 | 1.8 | 1.9 | 1.8 | 1.7 |
| 66 | 0.9 | 2.0 | 2.0 | 1.9 | 1.9 |
| 71 | 1.0 | 2.1 | 2.2 | 2.1 | 1.9 |
| 76 | 1.1 | 2.3 | 2.3 | 2.2 | 0.0 |
| 81 | 1.2 | 2.4 | 2.4 | 2.3 | 0.0 |
| 86 | 1.3 | 2.5 | 2.5 | 2.4 | 0.0 |
| 91 | 1.4 | 2.6 | 2.6 | 0.0 | 0.0 |
| 96 | 1.5 | 2.6 | 2.7 | 0.0 | 0.0 |

TABLE 7

(S = 4, R/S = 1)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.8 | 0.9 | 0.9 | 0.9 |
| 16 | 0.4 | 1.3 | 1.4 | 1.4 | 1.4 |
| 21 | 0.7 | 1.6 | 1.7 | 1.7 | 1.7 |
| 26 | 0.8 | 1.8 | 1.9 | 1.8 | 1.8 |
| 31 | 1.0 | 1.9 | 2.0 | 1.9 | 1.9 |
| 36 | 1.1 | 1.9 | 2.0 | 2.0 | 0.0 |
| 41 | 1.1 | 2.0 | 2.1 | 2.0 | 0.0 |
| 46 | 1.2 | 2.0 | 2.1 | 2.1 | 0.0 |
| 51 | 1.2 | 2.0 | 2.1 | 0.0 | 0.0 |
| 56 | 1.2 | 2.1 | 2.1 | 0.0 | 0.0 |
| 61 | 1.3 | 2.1 | 2.1 | 0.0 | 0.0 |
| 66 | 1.3 | 2.1 | 2.1 | 0.0 | 0.0 |
| 71 | 1.3 | 2.1 | 0.0 | 0.0 | 0.0 |
| 76 | 1.3 | 2.1 | 0.0 | 0.0 | 0.0 |
| 81 | 1.3 | 2.1 | 0.0 | 0.0 | 0.0 |
| 86 | 1.3 | 2.1 | 0.0 | 0.0 | 0.0 |
| 91 | 1.3 | 2.1 | 0.0 | 0.0 | 0.0 |
| 96 | 1.4 | 2.1 | 0.0 | 0.0 | 0.0 |

TABLE 8

(S = 4, R/S = 2)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.1 | 0.1 | 0.1 | 0.0 |
| 16 | 0.1 | 1.1 | 1.2 | 1.1 | 1.1 |
| 21 | 0.5 | 1.6 | 1.7 | 1.7 | 1.6 |
| 26 | 0.9 | 2.0 | 2.1 | 2.0 | 2.0 |
| 31 | 1.1 | 2.2 | 2.3 | 2.2 | 2.2 |
| 36 | 1.2 | 2.3 | 2.4 | 2.4 | 0.0 |
| 41 | 1.4 | 2.4 | 2.5 | 2.5 | 0.0 |
| 46 | 1.5 | 2.5 | 2.6 | 0.0 | 0.0 |
| 51 | 1.5 | 2.6 | 2.6 | 0.0 | 0.0 |
| 56 | 1.6 | 2.6 | 2.7 | 0.0 | 0.0 |
| 61 | 1.6 | 2.6 | 2.7 | 0.0 | 0.0 |
| 66 | 1.7 | 2.7 | 0.0 | 0.0 | 0.0 |
| 71 | 1.7 | 2.7 | 0.0 | 0.0 | 0.0 |
| 76 | 1.7 | 2.7 | 0.0 | 0.0 | 0.0 |
| 81 | 1.8 | 2.7 | 0.0 | 0.0 | 0.0 |
| 86 | 1.8 | 2.7 | 0.0 | 0.0 | 0.0 |
| 91 | 1.8 | 2.7 | 0.0 | 0.0 | 0.0 |
| 96 | 1.8 | 2.7 | 0.0 | 0.0 | 0.0 |

TABLE 9

(S = 4, R/S = 4)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.0 | 0.0 | 0.0 | 0.0 |
| 16 | 0.0 | 0.0 | 0.0 | 0.0 | 0.0 |
| 21 | 0.0 | 0.7 | 0.7 | 0.7 | 0.6 |
| 26 | 0.3 | 1.4 | 1.4 | 1.3 | 1.3 |
| 31 | 0.6 | 1.8 | 1.9 | 1.8 | 1.7 |
| 36 | 0.9 | 2.1 | 2.2 | 2.1 | 0.0 |
| 41 | 1.2 | 2.3 | 2.4 | 2.3 | 0.0 |
| 46 | 1.4 | 2.5 | 2.6 | 0.0 | 0.0 |
| 51 | 1.5 | 2.7 | 2.7 | 0.0 | 0.0 |
| 56 | 1.6 | 2.8 | 2.8 | 0.0 | 0.0 |
| 61 | 1.7 | 2.8 | 2.9 | 0.0 | 0.0 |
| 66 | 1.8 | 2.9 | 0.0 | 0.0 | 0.0 |
| 71 | 1.9 | 3.0 | 0.0 | 0.0 | 0.0 |
| 76 | 1.9 | 3.0 | 0.0 | 0.0 | 0.0 |
| 81 | 2.0 | 3.1 | 0.0 | 0.0 | 0.0 |
| 86 | 2.0 | 3.1 | 0.0 | 0.0 | 0.0 |
| 91 | 2.0 | 3.1 | 0.0 | 0.0 | 0.0 |
| 96 | 2.1 | 3.1 | 0.0 | 0.0 | 0.0 |

TABLE 10

(S = 8, R/S = 1)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.3 | 0.4 | 0.3 | 0.3 |
| 11 | 0.4 | 1.5 | 1.7 | 1.7 | 1.7 |
| 16 | 0.9 | 2.1 | 2.2 | 2.2 | 2.2 |
| 21 | 1.2 | 2.3 | 2.5 | 2.4 | 0.0 |
| 26 | 1.4 | 2.5 | 2.6 | 0.0 | 0.0 |
| 31 | 1.5 | 2.6 | 2.7 | 0.0 | 0.0 |
| 36 | 1.6 | 2.6 | 0.0 | 0.0 | 0.0 |
| 41 | 1.7 | 2.7 | 0.0 | 0.0 | 0.0 |
| 46 | 1.7 | 2.7 | 0.0 | 0.0 | 0.0 |
| 51 | 1.7 | 2.7 | 0.0 | 0.0 | 0.0 |
| 56 | 1.8 | 2.7 | 0.0 | 0.0 | 0.0 |
| 61 | 1.8 | 0.0 | 0.0 | 0.0 | 0.0 |
| 66 | 1.8 | 0.0 | 0.0 | 0.0 | 0.0 |
| 71 | 1.8 | 0.0 | 0.0 | 0.0 | 0.0 |
| 76 | 1.8 | 0.0 | 0.0 | 0.0 | 0.0 |
| 81 | 1.8 | 0.0 | 0.0 | 0.0 | 0.0 |
| 86 | 1.8 | 0.0 | 0.0 | 0.0 | 0.0 |
| 91 | 1.8 | 0.0 | 0.0 | 0.0 | 0.0 |
| 96 | 1.8 | 0.0 | 0.0 | 0.0 | 0.0 |

TABLE 11

(S = 8, R/S = 2)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.0 | 0.0 | 0.0 | 0.0 |
| 11 | 0.0 | 0.8 | 0.9 | 0.8 | 0.7 |
| 16 | 0.5 | 1.8 | 1.9 | 1.8 | 1.8 |
| 21 | 1.0 | 2.3 | 2.4 | 2.3 | 0.0 |
| 26 | 1.4 | 2.6 | 2.7 | 0.0 | 0.0 |
| 31 | 1.6 | 2.8 | 2.9 | 0.0 | 0.0 |
| 36 | 1.7 | 2.9 | 0.0 | 0.0 | 0.0 |
| 41 | 1.9 | 3.0 | 0.0 | 0.0 | 0.0 |
| 46 | 1.9 | 3.1 | 0.0 | 0.0 | 0.0 |
| 51 | 2.0 | 3.1 | 0.0 | 0.0 | 0.0 |
| 56 | 2.1 | 0.0 | 0.0 | 0.0 | 0.0 |
| 61 | 2.1 | 0.0 | 0.0 | 0.0 | 0.0 |
| 66 | 2.1 | 0.0 | 0.0 | 0.0 | 0.0 |
| 71 | 2.2 | 0.0 | 0.0 | 0.0 | 0.0 |
| 76 | 2.2 | 0.0 | 0.0 | 0.0 | 0.0 |
| 81 | 2.2 | 0.0 | 0.0 | 0.0 | 0.0 |
| 86 | 2.2 | 0.0 | 0.0 | 0.0 | 0.0 |
| 91 | 2.2 | 0.0 | 0.0 | 0.0 | 0.0 |
| 96 | 2.2 | 0.0 | 0.0 | 0.0 | 0.0 |

TABLE 12

(S = 16, R/S = 1)

| $n_{eff}$ | $\gamma_{eff}$ | | | | |
|---|---|---|---|---|---|
| | 10 | 20 | 30 | 40 | 50 |
| 1 | 0.0 | 0.0 | 0.0 | 0.0 | 0.0 |
| 6 | 0.0 | 0.8 | 1.0 | 1.0 | 1.0 |
| 11 | 0.8 | 2.1 | 2.3 | 2.3 | 0.0 |
| 16 | 1.3 | 2.6 | 0.0 | 0.0 | 0.0 |
| 21 | 1.6 | 2.9 | 0.0 | 0.0 | 0.0 |
| 26 | 1.8 | 3.0 | 0.0 | 0.0 | 0.0 |
| 31 | 1.9 | 0.0 | 0.0 | 0.0 | 0.0 |
| 36 | 2.0 | 0.0 | 0.0 | 0.0 | 0.0 |
| 41 | 2.1 | 0.0 | 0.0 | 0.0 | 0.0 |
| 46 | 2.1 | 0.0 | 0.0 | 0.0 | 0.0 |
| 51 | 2.1 | 0.0 | 0.0 | 0.0 | 0.0 |
| 56 | 2.1 | 0.0 | 0.0 | 0.0 | 0.0 |
| 61 | 2.2 | 0.0 | 0.0 | 0.0 | 0.0 |
| 66 | 2.2 | 0.0 | 0.0 | 0.0 | 0.0 |
| 71 | 0.0 | 0.0 | 0.0 | 0.0 | 0.0 |
| 76 | 0.0 | 0.0 | 0.0 | 0.0 | 0.0 |
| 81 | 0.0 | 0.0 | 0.0 | 0.0 | 0.0 |
| 86 | 0.0 | 0.0 | 0.0 | 0.0 | 0.0 |

TABLE 12-continued (S = 16, R/S = 1)

$\gamma_{eff}$

| $n_{eff}$ | 10 | 20 | 30 | 40 | 50 |
|---|---|---|---|---|---|
| 91 | 0.0 | 0.0 | 0.0 | 0.0 | 0.0 |
| 96 | 0.0 | 0.0 | 0.0 | 0.0 | 0.0 |

These tables were generated from the following equations:

$$\left[\frac{\alpha(K+S+R)}{Sn_{eff}} + 1.5\right]\left[1 - (1 - W(t,K)\varepsilon_S^{1/(t+1)})^{1/\alpha}\right] = \quad (3.1)$$

$$2\left(1 - 2^{-\frac{\alpha(K+S+R)}{2Sn_{eff}}}\right)erfc\left(\sqrt{1.5 \cdot 10^{\gamma_{eff}/10} / \left(2^{\frac{\alpha(K+S+R)}{Sn_{eff}}} - 1\right)}\right) \times$$

$$\left[2 - \left(1 - 2^{-\frac{\alpha(K+S+R)}{2Sn_{eff}}}\right)erfc\left(\sqrt{1.5 \cdot 10^{\gamma_{eff}/10} / \left(2^{\frac{\alpha(K+S+R)}{Sn_{eff}}} - 1\right)}\right)\right]$$

where t is, for these purposes, R/2. In this equation, erfc is the integral function common to probability distribution analysis. The functions W and $\varepsilon_S$ are described in the following equations:

$$W(t,K) = \left[\binom{K+S+R-1}{t}\right]^{-1/(t+1)} \quad (3.2)$$

$$\varepsilon_s = 1 - \left(1 - \frac{\varepsilon}{\beta}\right)^\alpha \quad (3.3)$$

where $\varepsilon = 10^{-7}$ and the coefficient $\beta$ accounts for the effect of a descrambler on signal transmission. (For a scrambler polynomial with $m_{scr}$ nonzero coefficients, $\beta \sim m_{scr}$.)

In numerically solving Eq.(3.1), K should be treated as a continuous variable, consistent with the presentation of Eq.(3.2) in the gamma-log form. The K value obtained is then used in Eq. 1.5 to compute $b(\gamma_{eff}, R, S, n_{eff})$.

Equation (3.1) was programmed in MatLab and solved numerically using dichotomy, for values of $\gamma_{eff}$, $n_{eff}$, and sets of Reed-Solomon parameters (R, S). The initial K interval, for the dichotomy procedure, was (0,256−S−R). For each $\gamma_{eff}$ and $n_{eff}$, the values of $g_n$ were then determined from Eq. 1.1. These values were compared for the sets of parameters reflected in tables 1–12, which are contemplated by the G.lite standard. (The corresponding sets of parameters for G.dmt are [(1, 0) (1, 2) (1, 4) (1, 6) (1, 8) (1, 10) (1, 12) (1, 14) (1, 16) (2, 1) (2, 2) (2, 3) (2, 4) (2, 5) (2, 6) (2, 7) (2, 8) (4, 1) (4, 2) (4, 3) (4, 4) (8, 1) (8, 2) (16, 1)]. Accordingly, more tables would be required for G.dmt than for G.lite.) The sets of parameters (R, S) providing the maximal $g_n$ were found. Optimum FEC parameters (S/R/S/$g_{n,dB}$) were calculated for G.lite modem at different $n_{eff}$ and $\gamma_{eff}$ values (number of subcarriers runs from 1 to 96, an effective SNR runs from 10 to 50), and expressed in dB gain.

TABLE 13

Net Coding Gain $\gamma_{eff}$

| $n_{eff}$ | 10 | 20 | 30 | 40 | 50 |
|---|---|---|---|---|---|
| 1 | 1/0/0.0 | 1/0/0.0 | 1/0/0.0 | 1/0/0.0 | 1/0/0.0 |
| 6 | 1/0/0.0 | 16/1/0.8 | 16/1/1.0 | 16/1/1.0 | 16/1/1.0 |
| 11 | 16/1/0.8 | 16/1/2.1 | 16/1/2.3 | 16/1/2.3 | 8/1/1.7 |
| 16 | 16/1/1.3 | 16/1/2.6 | 8/1/2.2 | 8/1/2.2 | 8/1/2.2 |
| 21 | 16/1/1.6 | 16/1/2.9 | 8/1/2.5 | 8/1/2.4 | 4/1/1.7 |
| 26 | 16/1/1.8 | 16/1/3.0 | 8/2/2.7 | 4/2/2.0 | 4/2/2.0 |
| 31 | 16/1/1.9 | 8/2/2.8 | 8/2/2.9 | 4/2/2.2 | 4/2/2.2 |
| 36 | 16/1/2.0 | 8/2/2.9 | 4/2/2.4 | 4/2/2.4 | 2/2/1.6 |
| 41 | 16/1/2.1 | 8/2/3.0 | 4/2/2.5 | 4/2/2.5 | 2/2/1.7 |
| 46 | 16/1/2.1 | 8/2/3.1 | 4/4/2.6 | 4/1/2.1 | 2/4/1.8 |
| 51 | 16/1/2.1 | 8/2/3.1 | 4/4/2.7 | 2/4/2.0 | 2/4/2.0 |
| 56 | 16/1/2.1 | 4/4/2.8 | 4/4/2.8 | 2/4/2.1 | 2/4/2.1 |
| 61 | 16/1/2.2 | 4/4/2.8 | 4/4/2.9 | 2/4/2.2 | 2/4/2.2 |
| 66 | 16/1/2.2 | 4/4/2.9 | 2/4/2.4 | 2/4/2.3 | 2/4/2.3 |
| 71 | 8/2/2.2 | 4/4/3.0 | 2/4/2.4 | 2/4/2.4 | 2/2/2.0 |
| 76 | 8/2/2.2 | 4/4/3.0 | 2/4/2.5 | 2/4/2.4 | 1/4/1.6 |
| 81 | 8/2/2.2 | 4/4/3.1 | 2/4/2.5 | 2/4/2.5 | 1/4/1.7 |
| 86 | 8/2/2.2 | 4/4/3.1 | 2/4/2.6 | 2/4/2.5 | 1/4/1.7 |
| 91 | 8/2/2.2 | 4/4/3.1 | 2/4/2.6 | 2/4/2.5 | 1/8/1.8 |
| 96 | 8/2/2.2 | 4/4/3.1 | 2/8/2.7 | 1/8/1.9 | 1/8/1.9 |

In addition, optimum FEC parameters (S/R/S/$g_{l,dB}$) providing the maximal $g_n$ were calculated for G.lite modem at different $n_{eff}$ and $\gamma_{eff}$ values (number of subcarriers runs from 1 to 96, an effective SNR runs from 10 to 50) and expressed in dB line coding gain.

TABLE 14

Net Coding Gain $\gamma_{eff}$

| $n_{eff}$ | 10 | 20 | 30 | 40 | 50 |
|---|---|---|---|---|---|
| 1 | 1/0/0.0 | 1/0/0.0 | 1/0/0.0 | 1/0/0.0 | 1/0/0.0 |
| 6 | 1/0/0.0 | 16/1/5.2 | 16/1/5.3 | 16/1/5.1 | 16/1/5.1 |
| 11 | 16/1/3.7 | 16/1/4.8 | 16/1/4.8 | 16/1/4.7 | 8/1/4.0 |
| 16 | 16/1/3.4 | 16/1/4.5 | 8/1/3.9 | 8/1/3.8 | 8/1/3.7 |
| 21 | 16/1/3.3 | 16/1/4.3 | 8/1/3.7 | 8/1/3.7 | 4/1/2.9 |
| 26 | 16/1/3.1 | 16/1/4.2 | 8/2/4.6 | 4/2/3.9 | 4/2/3.9 |
| 31 | 16/1/3.0 | 8/2/4.5 | 8/2/4.5 | 4/2/3.8 | 4/2/3.8 |
| 36 | 16/1/3.0 | 8/2/4.4 | 4/2/3.8 | 4/2/3.7 | 2/2/2.9 |
| 41 | 16/1/2.9 | 8/2/4.3 | 4/2/3.7 | 4/2/3.7 | 2/2/2.9 |
| 46 | 16/1/2.8 | 8/2/4.2 | 4/4/4.7 | 4/1/2.6 | 2/4/3.9 |
| 51 | 16/1/2.8 | 8/2/4.2 | 4/4/4.7 | 2/4/3.9 | 2/4/3.9 |
| 56 | 16/1/2.8 | 4/4/4.6 | 4/4/4.6 | 2/4/3.9 | 2/4/3.8 |
| 61 | 16/1/2.7 | 4/4/4.5 | 4/4/4.5 | 2/4/3.8 | 2/4/3.8 |
| 66 | 16/1/2.7 | 4/4/4.5 | 2/4/3.9 | 2/4/3.8 | 2/4/3.7 |
| 71 | 8/2/3.0 | 4/4/4.4 | 2/4/3.8 | 2/4/3.8 | 2/2/2.7 |
| 76 | 8/2/2.9 | 4/4/4.4 | 2/4/3.8 | 2/4/3.7 | 1/4/2.9 |
| 81 | 8/2/2.9 | 4/4/4.3 | 2/4/3.8 | 2/4/3.7 | 1/4/2.9 |
| 86 | 8/2/2.9 | 4/4/4.3 | 2/4/3.7 | 2/4/3.6 | 1/4/2.9 |
| 91 | 8/2/2.9 | 4/4/4.2 | 2/4/3.7 | 2/4/3.6 | 1/8/3.9 |
| 96 | 8/2/2.8 | 4/4/4.2 | 2/8/4.7 | 1/8/4.0 | 1/8/3.9 |

These tables are one embodiment of finding preferred FEC parameters based on net coding gain. An alternative embodiment of the present invention for G.dmt would include more channels and more options for FEC parameters. In addition, much finer granularity, such as one unit steps, could be used to minimize the computing required of a device practicing the present invention. A useful table could be prepared for S−1. The table of preferred FEC parameters and resulting gains could list as many preferred sets of options as desired and need not be limited to one preferred set of options and resulting gains.

From these tables, a rough approximation can be made for any pair of values $n_{eff}$ and $\gamma_{eff}$ by taking the table entry closest to the values measured. For instance, a rough approximation to 88, 12 would be the table element for 86, 10. Table 13 indicates that the best FEC parameters, if supported by both the CO and RT, would be 8 dmt symbols per frame and 2 redundancy symbols per dmt symbol (16 per codeword), producing a net SNR gain of 2.2 dB per channel or subcarrier. The corresponding line coding gain is reflected in Table 14. Other, more precise interpolation methods can readily be used, for instance linear interpolation. If additional data is stored, effectively increasing the size of the data tables, linear spline or bicubic splines could be used to generate gain values for any arbitrary pair of values $n_{eff}$ and $\gamma_{eff}$ at each set of FEC parameters that is considered. Or, as described above, tables with very fine granularity may produce sufficiently accurate results without any interpolation or on the fly computation of gains.

4. ADSL Setting of FEC Parameters

Figure 3A:
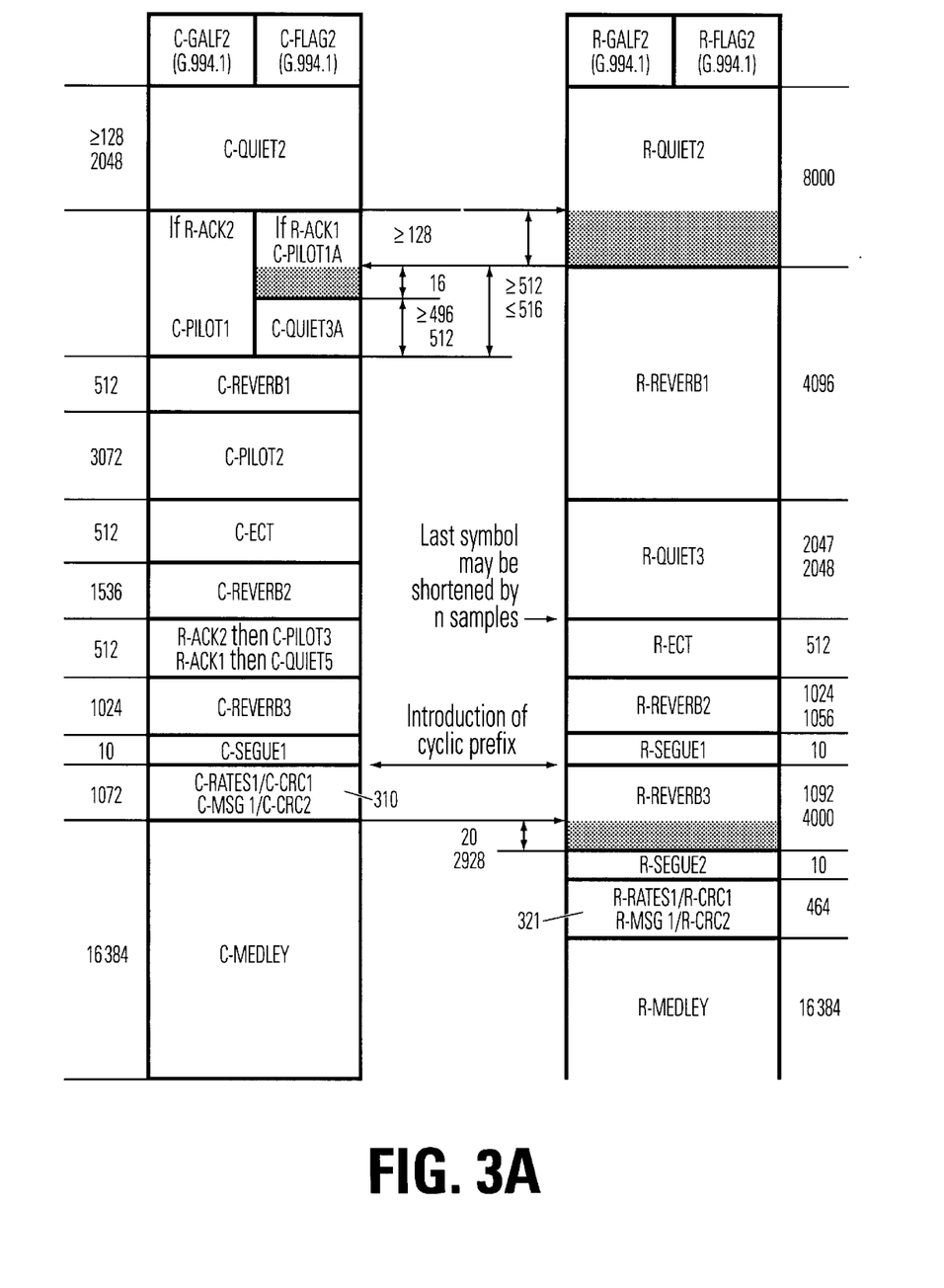
FIGS. 3A–B are the ITU's protocol for initialization of an xDSL communications session.
Figure 3B:
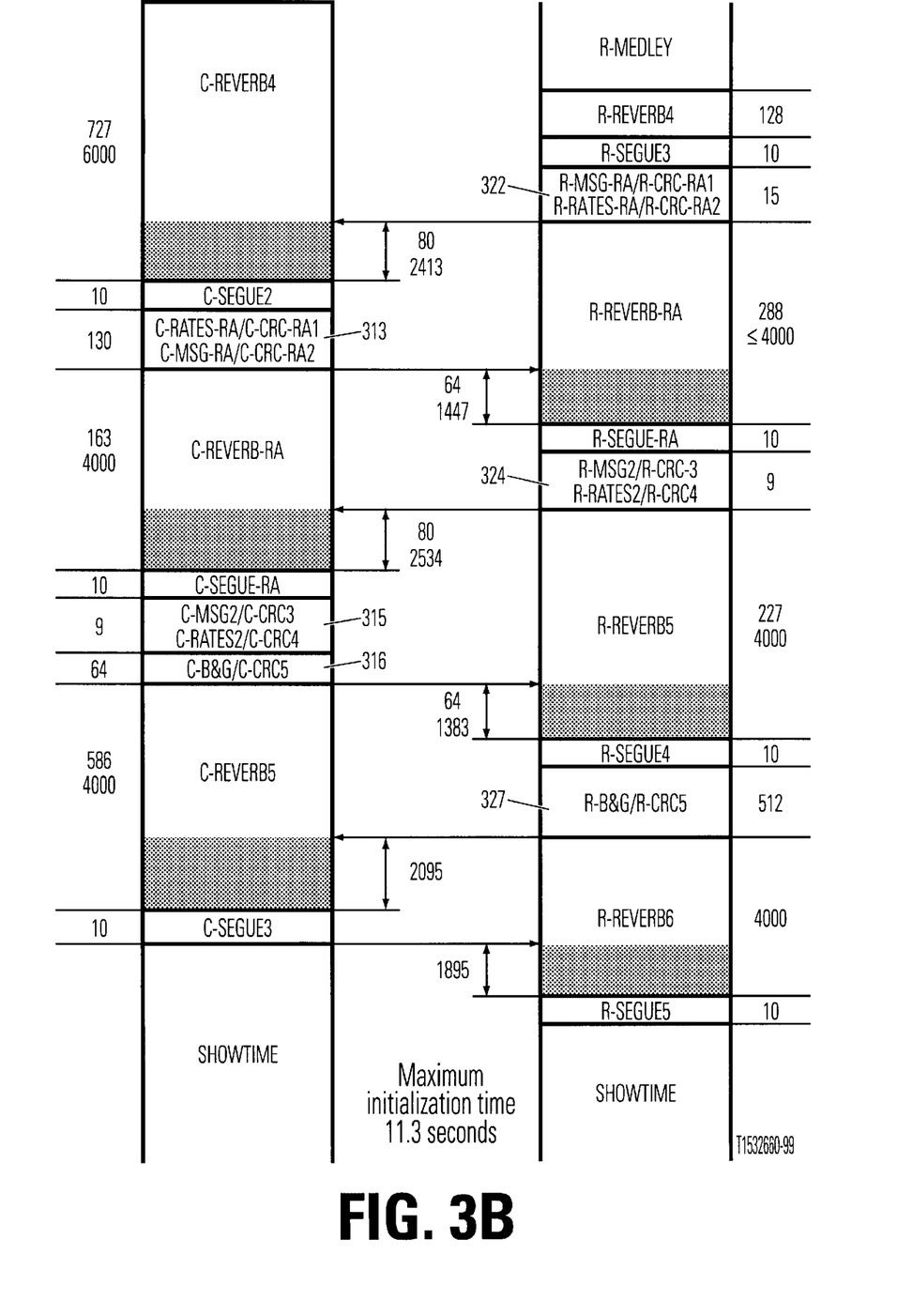
Figure 4A:
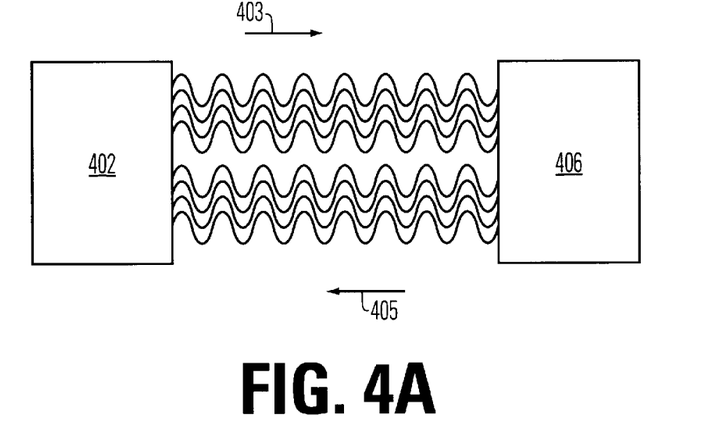
FIGS. 4A–B depict in block diagram form a process embodying the present invention.
Figure 4B:
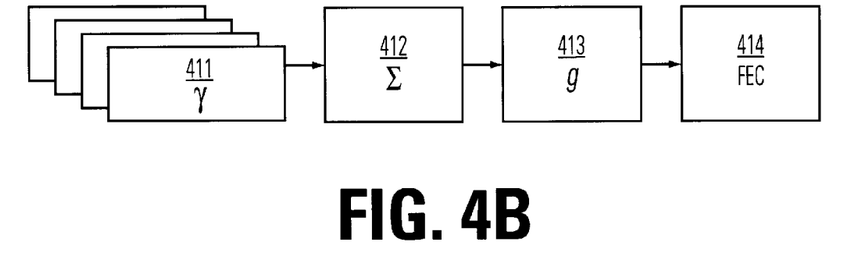

In the environment of ADSL communications and particularly in the environment of G.dmt/G.lite compliance, the present invention can be applied to the initialization protocols specified in the current versions of G.992.1 and G.992.2. FIGS. 3A–3B are taken from the current version of the G.992.1 standard. These figures were chosen over the corresponding figures in the G.992.2 standard, which were suspected to contain errors.

The aspects of the standard ADSL initialization procedure considered relevant for negotiation of FEC parameters are labeled in FIGS. 3A–3B. In these figures, the left hand column represents messages originating with the central office (C) terminal and the right column represents messages originating with the remote (R) terminal. Negotiations regarding downstream and upstream communications proceed in parallel. The description of these messages which follows will be somewhat abbreviated, as those of skill in the art will be able to locate whatever additional information they desire in the standards documents. The emphasis will be on strategies for the CO and RT to employ, which embody aspects of the present invention.

The procedure of setting FEC parameters in an ADSL G.lite/G.dmt-compliant system consists in an exchange of the following messages between CO and RT including the following messages. Where two logical messages appear on the same line, the can be combined into a single transmission:

C-RATES1→C-MSG1→

R-RATES1←R-MSG1←

R-MSG-RA←R-RATES-RA←

C-RATES-RA→C-MSG-RA→

R-MSG2←R-RATES2←

C-MSG2→C-RATES2

This exchange of messages is explained first from the RT perspective, then from the CO perspective—the two are not entirely symmetrical.

A. RT Side of the Exchange

The RT side of the FEC-related information exchange proceeds as follows.

At 310, RT receives C-RATES1 from CO. This message includes 4 options for S, the number of DMT symbols per FEC frame, and R/S, which is the number of control code symbols per DMT symbol. Options are transmitted for both upstream and downstream channels and are listed in order of decreasing preference. RT also receives C-MSG1 from CO. This message includes $\mu$, the margin, and $b_{max}$, the maximum number of bits per bin for downstream transmission. These values are preliminary, as they precede measurements of signal strength.

At 321, RT sends R-RATES1 to CO providing 4 options of (S, R/S) parameters transmitted in order of decreasing preference, for upstream transmission. As CO has control over the data rates, these options may be copied from C-RATES1. RT also sends R-MSG1 to CO providing the maximum number of bits per bin for upstream transmission.

At 322, RT sends R-MSG-RA to CO providing the following parameters for downstream transmission: $n_{eff}$, the number of subcarriers, the best (at S=1) estimates of R and K=N−R−1, where N is the number of code symbols in a FEC frame and K is the number of code symbols in the information part of the frame; $g_{l,dB}$, the line coding gain per subcarrier; and $B_{DMT}$, the DMT symbol size.

In preparing R-MSG-RA, the RT should take advantage of having measured the downstream SNR ($\Gamma_i$) distribution over subcarriers or channels. RT should compute $\gamma_i = \Gamma_i - \mu$, the margin-corrected SNR distribution. (The margin value $\mu$ was received in C-MSG1.) RT should determine the number of subcarriers carrying data downstream, $n_{eff}$, as follows: (i) for each subcarrier, it computes $b_{i,0}$, the number of bits to be loaded at that subcarrier without FEC at the bit error rate $\epsilon = 10^{-7}$ (Eq.(2.3)); (ii) estimates $$n_{eff} = \sum_{b_{i,0}>0} 1,$$

the number of channels loaded with one or more bits. RT computes $\gamma_{eff} = \Sigma \gamma_i / n_{eff}$, the average SNR of the downstream channel. RT should find the best set or sets of (R; $g_{l,dB}$; N−R−1; $b_i = b_{i,0} + g_{l,dB}/3.01$, i=1, ..., $n_{eff}$; $B_{DMT} = \Sigma \min(b_i, b_{max})$ at S=1 and $\epsilon = 10^{-7}$ In preparing R-RATES-RA, the RT should computes $\gamma_i$, $n_{eff}$, and $\gamma_{eff}$ as described above. With this information, RT can find the best (S, R/S, $g_{d,dB}$) triplet(s) at $\epsilon = 10^{-7}$, applying the equations and procedure set out above. If it is one of the options RT received with C-RATES1 matches triplet(s) it found, it sends that option's number back to CO in R-RATES-RA. Otherwise it indicates in R-RATES-RA that no option was selected.

At 313, RT receives C-RATES-RA with 4 options of (S, R/S) parameters transmitted in order of decreasing preference. This list of options is not constrained by previous messages. RT also receives C-MSG-RA with a potentially revised margin for downstream transmission.

At 324, RT sends R-MSG2 to CO providing the DMT symbol size for downstream transmission corresponding to the downstream margin received in C-MSG-RA for (S, R/S) option chosen in R-RATES2 at $\epsilon = 10^{-7}$. It also sends R-RATES2 back to CO providing the best (S,R/S) option from C-RATES-RA.

In preparing R-MSG2 and R-RATES2, the RT should computes $\gamma_i = \Gamma_i - \mu$, the margin-corrected SNR distribution. The margin value is received in C-MSG-RA. If the margin and channel strengths are unchanged, this calculation is easily optimized. RT determines $\{b_{i,o}\}$ and $n_{eff}$ and $\gamma_{eff}$ as described above. RT finds the best (S, R/S, $g_{d,dB}$) triplet(s) chosen from 4 options it received in C-RATES-RA at $\epsilon = 10^{-7}$, as described in the equations and procedures above. Then it computes the size of DMT symbol for sending it with R-MSG2, as follows: $b_i = b_{i,0} + g_{d,dB}/3.01$, i=1, ... $n_{eff}$, $B_{DMT} = \Sigma \min(b_i, b_{max})$.

At 315, RT receives C-MSG2 with the margin and DMT symbol size the upstream channel can support. RT also receives C-RATES2, a reply to R-RATES-RA from CO, with final downstream and upstream FEC sets.

B. CO Side of the Exchange

The CO side of the FEC-related information exchange largely, but not completely, parallels the RT side.

At 310, CO sends C-RATES1 to RT providing 4 options of (S, R/S) parameters transmitted in order of decreasing preference. In preparing for C-RATES1, the CO does not have any downstream SNR information, unless it is using historical information from prior communication sessions. Therefore, four best (S, R/S) sets for downstream transmission are determined from lookup tables at values such as $\gamma_{eff}$=50 dB and $n_{eff}$=96, which are the best possible performance conditions of the downstream channel in one set of tables embodying aspects of the present invention. At this moment, CO has not measured the upstream SNR either. Therefore, four best (S,R/S) sets for upstream transmission are also determined from lookup tables, preferably at $\gamma_{eff}$=50 dB and $n_{eff}$=26, when these are the best possible performance conditions of the upstream channel). CO also sends C-MSG1 to RT providing the margin and maximum number of bits per bin for downstream transmission.

At 321, CO receives R-RATES1 with RT's choice of 4 options of (S, R/S) parameters for upstream transmission. CO also receives R-MSG1 with RT's choice of the margin and maximum number of bits per bin, for upstream transmission.

At 322, CO receives R-MSG-RA with RT's best (at S=1) estimates of R; K=N−1−R, coding gain, size of DMT symbol (with margin from C-MSG1), for downstream transmission. CO also receives R-RATES-RA with RT's best (S, R/S) choice from 4 options CO earlier sent with C-RATES1, for downstream transmission.

At 313, CO sends C-RATES-RA to RT providing 4 options of (S, R/S) parameters, transmitted in order of decreasing preference. These options are not constrained by previous messages. In preparing for C-RATES-RA, CO takes advantage of ($g_{l,dB}$, $n_{eff}$, $B_{DMT}$) received from RT in R-MSG-RA. Using equations (2.5) or (2.8) set forth above, CO evaluates $\gamma_{eff}$ of the downstream station. Given $\gamma_{eff}$ and $n_{eff}$, CO finds four best or preferred sets of (S, R/S) for downstream transmission at $\epsilon=10^{-7}$. Depending on CO's affinity with RT, CO may use the (S, R/S) set from R-RATES-RA, as one of the four best sets of (S, R/S). Using Eq.(1.11) it may also adjust the DMT symbol size to account for the additional coding gain available from the optimum (S, R/S) sets. And, the four sets do not necessarily have to be distinct. By this time, CO has the upstream SNR ($\Gamma_i$) distribution over subcarriers measured. CO computes $\gamma_i=\Gamma_i-\mu$, the margin-corrected SNR distribution. The margin value is typically predefined by standard or the CO operator. CO computes $\gamma_{eff}$ and $n_{eff}$ of the upstream channel, as described for the RT's computations of the downstream channels. CO finds, for upstream transmission, four preferred or best (S, R/S, $g_{l,dB}$) triplets at $\epsilon=10^{-7}$, using equations and methods described above.

Also at 313, CO sends C-MSG-RA to RT providing a potentially revised margin for downstream transmission.

At 324, CO receives R-MSG2 with RT's estimate of the size of DMT symbol, based on the downstream margin CO sent in C-MSG-RA and the option chosen by RT in R-RATES2, at $\epsilon=10^{-7}$ for downstream transmission. CO also receives R-RATES2 with RT's best (S, R/S) option from C-RATES-RA based on RT's downstream channel analysis.

At 315, CO sends C-MSG2 to RT providing the margin and DMT symbol size the upstream channel can support. In preparing for C-MSG2, CO should take advantage of having measured the upstream SNR ($\Gamma_i$) distribution over subcarriers or channels. CO computes $\gamma_i=\Gamma_i-\mu$, the margin-corrected SNR distribution. The margin value, again, is typically is predefined. CO computes $\{b_{i,0}\}$, $n_{eff}$ and $\gamma_{eff}$ of the upstream channel, as described for RT. CO then finds the preferred or best (S, R/S, $g_{l,dB}$) triplet(s) at $\epsilon=10^{-7}$, using the equations and methods described above. It computes $b_i=b_{i,0}+g_{l,dB}/3.01$, i=1, . . . , $n_{eff}$, $B_{DMT}=\Sigma\min(b_i, b_{max})$. It sends $B_{DMT}$ obtained for the best set of (S, R/S), with C-MSG2. The best (S, R/S) set is used later in C-RATES2. CO also sends C-RATES2 to RT, with final downstream and upstream FEC sets. For preparation of C-RATES2, for upstream transmission, CO uses the FEC settings determined in for C-MSG2. For downstream transmission, CO uses the best (S,R/S) set at $\epsilon=10^{-7}$, as defined in C-RATES-RA. Or, depending on CO's affinity with RT, CO may use the set received from RT in R-RATES2 (in case those two sets are not the same).

The exchange leads to transmission of detailed bits and gains information, on a channel by channel basis, at 316 and 327.

The principal advantage of the present invention is increased throughput. In addition, transmission parameters such as bit error rate and margin can be adjusted to values other than defaults. Preferably, the CO and RT use the same method for selecting FEC or other communication parameters, improving the effectiveness of initialization procedures and minimizing the chance that the CO would impose disadvantageous parameters on the RT.

While the embodiments described address existing ITU G.992 series standards, the present invention is not so limited. It applies as well to other communications employing forward error correction or equivalent techniques of compensating for noisy communication channels. It also applies to future standards which may include automatic retransmission requests at the data channel level. Those of ordinary skill in the art will appreciate that the present invention is broadly applicable for a variety of multi-channel communication methods, potentially including parameters other than FEC parameters.

What is claimed is:

1. A method of selecting forward error correction parameters for use in a multi-channel communications session, including the steps:

acquiring signal to noise ratio data for a set of communication channels used in a communications session;

identifying a subset of the communication channels to be loaded with data bits;

computing an average signal to noise ratio for the subset of communication channels; and selecting one or more sets of forward error correction parameters to be applied in a transmitter based on the average signal to noise ratio, a count of channels in the subset of communication channels, and a predicted net signal gain from application of the selected forward error correction parameters.

2. The method of claim 1, wherein Reed-Solomon encoding is utilized in the communications session.

3. The method of claim 2, wherein:

the Reed-Solomon encoding depends on S, which is a number of symbol sets per Reed-Solomon codeword, and R, which is a number of forward error correction symbols per Reed-Solomon codeword; and the sets of selected forward error correction parameters include the S and a ratio R/S.

4. The method of claim 3, wherein the symbol sets consist essentially of dmt symbols.

5. The method of claim 3, wherein each of the symbol sets consist essentially of data carried by the subset of communication channels in one transmission interval.

6. The method of claim 3, wherein a universe from which parameters S and the ratio R/S are selected is set by an international standard.

7. The method of claim 3, wherein the parameters (S, R/S) are selected from [(1, 0) (1, 4) (1, 8) (1, 16) (2, 2) (2, 4) (2, 8) (4, 1) (4, 2) (4, 4) (8, 1) (8, 2) (16, 1)].

8. The method of claim 3, wherein the parameters (S, R/S) are selected from [(1, 0) (1, 2) (1, 4) (1, 6) (1, 8) (1, 10) (1, 12) (1, 14) (1, 16) (2, 1) (2, 2) (2, 3) (2, 4) (2, 5) (2,6) (2,7) (2,8) (4, 1) (4,2) (4,3) (4,4) (8, 1) (8, 2) (16, 1)].

9. The method of claim 1, wherein the selecting step further includes adjusting the average signal to noise ratio by a safety margin, before selecting parameters based on the average signal to noise ratio.

10. The method of claim 1, further including the steps of transmitting the selected parameters from a receiving terminal to a sending terminal and the sending terminal accepting the selected parameters.

11. The method of claim 1, wherein the selecting step is carried out by a receiving terminal in communication with a sending terminal, further including the step of the sending terminal specifying a plurality of sets of forward error correction parameters.

12. A method of selecting forward error correction parameters for use in a communications session having multiple upstream and downstream communication channels, including the steps:

acquiring signal to noise ratio data for a set of communication channels;

identifying a subset of the communication channels to be loaded with data bits;

computing an average signal to noise ratio for the subset of communication channels; and selecting one or more sets of forward error correction parameters to be applied in a transmitter based on the average signal to noise ratio, a count of channels in the subset of communication channels, and a predicted net signal gain from application of the selected forward error correction parameters;

wherein the acquiring, identifying, computing and selecting steps are carried out by a downstream terminal for downstream channels of the communications session and by an upstream terminal for upstream channels of the communications session.

13. The method of claim 12, wherein Reed-Solomon encoding is utilized in the communications session.

14. The method of claim 13, wherein:

the Reed-Solomon encoding depends on S, which is a number of symbol sets per Reed-Solomon codeword, and R, which is a number of forward error correction symbols per Reed-Solomon codeword; and the sets of selected forward error correction parameters include the S and a ratio R/S.

15. The method of claim 14, wherein the symbol sets consist essentially of dmt symbols.

16. The method of claim 14, wherein each of the symbol sets consist essentially of data carried by the subset of communication channels in one transmission interval.

17. The method of claim 14, wherein a universe from which the parameters S and the ratio R/S are selected is set by an international standard.

18. The method of claim 14, wherein the parameters (S, R/S) are selected from [(1, 0) (1, 4) (1, 8) (1, 16) (2, 2) (2, 4) (2, 8) (4, 1) (4, 2) (4, 4) (8, 1) (8, 2) (16, 1)].

19. The method of claim 14, wherein the parameters (S, R/S) are selected from [(1, 0) (1, 2) (1, 4) (1, 6) (1, 8) (1, 10) (1, 12) (1, 14) (1, 16) (2, 1) (2, 2) (2, 3) (2, 4) (2, 5) (2, 6) (2, 7) (2, 8) (4, 1) (4, 2) (4, 3) (4, 4) (8, 1) (8, 2) (16, 1)].

20. The method of claim 12, further including the step of the upstream terminal specifying the sets of forward error correction parameters from which the downstream terminal may select.

21. The method of claim 12, wherein the selecting step further includes adjusting the average signal to noise ratio by a safety margin, before selecting parameters based on the average signal to noise ratio.

22. The method of claim 12, further including the steps of transmitting the selected parameters from a receiving terminal to a sending terminal and accepting the selected parameters.

23. A method of selecting forward error correction parameters for use in a communications session having multiple communication channels, including the steps:

predicting net signal to noise ratio gains for pairs of forward error correction parameters S and R/S across a range of average signal to noise ratios and a range of number communication channels to be loaded with data bits, wherein S is the number of symbols sets per codeword and R/S is a number redundancy symbols per codeword divided by S;

storing preferred pairs of forward error correction parameters for at least a portion of the range of signal to noise ratios and at least a portion of the range of number of communication channels to be loaded with data bits, corresponding to the predicted net signal to noise ratio gains; and selecting one or more preferred pairs of forward error correction parameters for use in a particular communications session, based on an average of measured signal to noise ratios of the multiple communication channels, and a count of the communication channels to be loaded with data bits.

24. The method of claim 23, wherein the preferred sets of parameters are stored in a table organized by the average signal to noise ratio and the number of communication channels to be loaded with data bits.

25. The method of claim 23, wherein the range of average signal to noise ratios effectively covered by includes 10–50 dB.

26. The method of claim 23, wherein the range of number of communication channels potentially loaded with data bits effectively covered includes 1 to 96 channels.

27. The method of claim 23, wherein the range of number of communication channels potentially loaded with data bits effectively covered includes 1 to 224 channels.

28. The method of claim 23, wherein the range of number of communication channels potentially loaded with data bits includes 1 to 26 channels.

29. A method of selecting forward error correction parameters for use in a communications session having multiple communication channels, including the steps:

storing functions for predicting a net signal to noise ratio gain for pairs of forward error correction parameters S and R/S across a range of average signal to noise ratios and a range of number communication channels to be loaded with data bits, wherein S is the number of symbols sets per codeword and R/S is a number redundancy symbols per codeword divided by S;

measuring an average signal to noise ratio of multiple communication channels for a communications session and counting a number of the communication channels to be loaded with bits;

predicting the net signal to noise ratio gain for the pairs of forward error correction parameters, based on the measured average signal to noise ratio and the counted number of communication channels to be loaded with bits;

selecting one or more preferred pairs of forward error correction parameters for use in a particular communications session, based on the predicted net signal to ratio gain.

30. The method of claim 29, wherein the functions are stored as bicubic splines.

31. The method of claim 29, wherein the functions are stored as a series of interpolation tables indexed by the measured average signal to noise ratio and the counted number of communication channels to be loaded with bits.

* * * * *